United States Patent
Chennupati et al.

(10) Patent No.: US 11,743,724 B2
(45) Date of Patent: *Aug. 29, 2023

(54) SYSTEM AND METHOD FOR ACCESSING A PRIVATELY HOSTED APPLICATION FROM A DEVICE CONNECTED TO A WIRELESS NETWORK

(71) Applicant: Tata Communications (UK) Limited, London (GB)

(72) Inventors: Ranjith Kumar Chennupati, London (GB); Stuart Mitchell, London (GB); Marc Schneider, London (GB); Eric Alistair Williams, Pembroke Pines, FL (US)

(73) Assignee: Tata Communications (UK) Limited, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/678,709

(22) Filed: Feb. 23, 2022

(65) Prior Publication Data
US 2022/0182827 A1 Jun. 9, 2022

Related U.S. Application Data

(63) Continuation of application No. 16/479,196, filed as application No. PCT/IB2018/051011 on Feb. 19, 2018, now Pat. No. 11,272,366.
(Continued)

(51) Int. Cl.
*H04W 12/06* (2021.01)
*H04L 9/40* (2022.01)

(52) U.S. Cl.
CPC ....... *H04W 12/068* (2021.01); *H04L 63/0272* (2013.01)

(58) Field of Classification Search
CPC .......................... H04W 12/068; H04L 63/0272
See application file for complete search history.

(56) References Cited

U.S. PATENT DOCUMENTS

| | | |
|---|---|---|
| 8,892,766 B1 | 11/2014 | Wei et al. |
| 9,015,809 B2 | 4/2015 | Brown et al. |

(Continued)

FOREIGN PATENT DOCUMENTS

| | | |
|---|---|---|
| EP | 1826969 A1 | 8/2007 |
| WO | 2012/037674 A2 | 3/2012 |
| WO | 2016/073916 A1 | 5/2016 |

OTHER PUBLICATIONS

Combined Search and Examination Report issued in Great Britain patent application No. GB2109400.8, dated Sep. 3, 2021, 5 pp.
(Continued)

*Primary Examiner* — Vu V Tran
(74) *Attorney, Agent, or Firm* — Kaplan Breyer Schwarz, LLP (57) ABSTRACT

A method and system for determining a path of data traffic based on a destination Internet Protocol (IP) address, the destination IP address being either private or public and belonging to any one of multiple organizations. In the method and system, a VPN is activated at a telecommunication endpoint. In response to activating the VPN, a service device on a private network interconnects with a VPN gateway. A subscriber identifier associated with the telecommunication endpoint and the destination IP address of one of the multiple organizations is received at a managed service platform. If both the subscriber identifier and the destination IP address of the one of the multiple organizations are not registered in a predetermined policy database at the telecommunication endpoint, a subscriber identified by the subscriber identifier is prompted to register the subscriber identifier associated with the telecommunication endpoint.

(Continued)

The subscriber identifier is then registered in the predetermined policy database, based on information received from the telecommunication endpoint in response to the prompting. If the subscriber identifier and the destination IP address of the one of the multiple organizations are registered in the predetermined policy database, the service device on the private network routes the data traffic to a private network resource of the one of the multiple organizations matching the destination IP address. If the subscriber identifier is registered in the predetermined policy database and the destination IP address of the one of the multiple organizations is not registered in the predetermined policy database, the service device on the private network routes the data traffic via an IP transit service to a public internet.

16 Claims, 5 Drawing Sheets

Related U.S. Application Data (60) Provisional application No. 62/460,569, filed on Feb. 17, 2017.

(56) References Cited

U.S. PATENT DOCUMENTS

| | | | |
|---|---|---|---|
| 9,690,925 | B1 | 6/2017 | Banerjee |
| 10,798,560 | B2 | 10/2020 | Chennupati et al. |
| 11,272,366 | B2 | 3/2022 | Chennupati et al. |
| 2005/0060328 | A1 | 3/2005 | Suhonen et al. |
| 2010/0330957 | A1 | 12/2010 | Harada et al. |
| 2012/0079122 | A1* | 3/2012 | Brown ............... H04L 12/4641 709/227 |
| 2013/0054763 | A1 | 2/2013 | Van et al. |
| 2014/0073355 | A1 | 3/2014 | Ward et al. |
| 2014/0162684 | A1 | 6/2014 | Shaw |
| 2014/0380450 | A1 | 12/2014 | Coskun et al. |
| 2015/0139084 | A1 | 5/2015 | Kaczmarska-Wojtania et al. |
| 2016/0134616 | A1 | 5/2016 | Koushik et al. |
| 2016/0134624 | A1* | 5/2016 | Jacobson ............. H04W 12/06 726/4 |
| 2016/0173535 | A1* | 6/2016 | Barabash ............. H04L 41/342 726/1 |
| 2016/0301779 | A1* | 10/2016 | Cui ..................... H04L 45/308 |
| 2019/0387403 | A1 | 12/2019 | Chennupati et al. |
| 2021/0021987 | A1 | 1/2021 | Chennupati et al. |
| 2021/0367944 | A1* | 11/2021 | Gupta .................. H04L 67/56 |

OTHER PUBLICATIONS

Notice of Allowance dated Oct. 27, 2021 for U.S. Appl. No. 16/479,196.

"Class of Service", "Wikipedia", 2 pp., https://en.wikipedia.org/wiki/Class_of_service, Jul. 17, 2019.

Authorized Officer: Hultsch, Wolfgang, International Search Report and Written Opinion issued in related PCT application No. PCT/IB2018/050436, dated Apr. 18, 2018, 13 pp.

Authorized Officer: Raposo Pires, Joao, International Search Report and Written Opinion issued in PCT application No. PCT/IB2018/051011, dated May 29, 2018, 13 pp.

Non-Final Office Action dated May 27, 2021 for U.S. Appl. No. 16/479,196.

Notice of Allowance and Fees Due (PTOL-85) dated May 19, 2020 for U.S. Appl. No. 16/479,189.

Notice of Allowance and Fees Due dated Feb. 21, 2023 for U.S. Appl. No. 17/063,461.

Non-Final Office Action dated Oct. 27, 2022 for U.S. Appl. No. 17/063,461.

* cited by examiner

SYSTEM AND METHOD FOR ACCESSING A PRIVATELY HOSTED APPLICATION FROM A DEVICE CONNECTED TO A WIRELESS NETWORK

RELATED APPLICATIONS

This application is a continuation of U.S. patent application Ser. No. 16/479,196, filed Jul. 18, 2019, which is a 371 of PCT/IB2018/051011, filed Feb. 19, 2018, which claims the benefit of U.S. Provisional Patent Application Ser. No. 62/460,569 filed Feb. 17, 2017, the entire disclosure of which is incorporated herein by reference.

FIELD

The present disclosure relates to telecommunications. In particular, the present disclosure relates to a system and method for securely accessing a privately hosted application or cloud application from a wireless local-area network (LAN) connected device.

BACKGROUND

Currently, there are well known and commonly used methods of securely accessing an organization's privately hosted or public cloud applications from a mobile device or other type of wireless device. "Privately hosted" in this context means that the host application cannot be accessed directly through the public Internet natively without the use of a Virtual Private Network (VPN) application, VPN setup on the device or VPN capabilities embedded within the application's client or VPN capabilities embedded as a part of a Mobile Device Management (MDM)/Enterprise Mobile Management (EMM) solution.

Some approaches in the prior art, including traditional VPN-based solutions, have attempted to use the public Internet to accommodate the accessing of private network data. However, a VPN in at least some approaches in the prior art does not work well in situations where the wireless user sometimes wants to gain access to their enterprise network, but alternates between accessing the enterprise network and accessing websites in the public Internet (e.g., Facebook™, YouTube™, etc.) through apps dedicated to those websites.

SUMMARY

The present disclosure is directed to a technological approach for securely accessing a privately hosted application or cloud application from a wireless local-area network (LAN) connected device. Aspects of the present disclosure include a method and system for determining a path of data traffic based on a destination Internet Protocol (IP) address, the destination IP address being either private or public and belonging to any one of multiple organizations. In the method and system, a VPN is activated at a telecommunication endpoint. In response to activating the VPN, a service device on a private network interconnects with a VPN gateway. A subscriber identifier associated with the telecommunication endpoint and the destination IP address of one of the multiple organizations is received at a managed service platform. If both the subscriber identifier and the destination IP address of the one of the multiple organizations are not registered in a predetermined policy database at the telecommunication endpoint, a subscriber identified by the subscriber identifier is prompted to register the subscriber identifier associated with the telecommunication endpoint. The subscriber identifier is then registered in the predetermined policy database, based on information received from the telecommunication endpoint in response to the prompting. If the subscriber identifier and the destination IP address of the one of the multiple organizations are registered in the predetermined policy database, the service device on the private network routes the data traffic to a private network resource of the one of the multiple organizations matching the destination IP address. If the subscriber identifier is registered in the predetermined policy database and the destination IP address of the one of the multiple organizations is not registered in the predetermined policy database, the service device on the private network routes the data traffic via an IP transit service to a public internet.

In some embodiments, the private network resource is a wide-area network of the one of the multiple organizations matching the destination IP address. In some embodiments, the service device on the private network interconnects directly with the wide-area network.

In some embodiments, the private network resource is a cloud service provider platform of the one of the multiple organizations matching the destination IP address.

In some embodiments, the service device on the private network interconnects directly with the cloud service provider platform.

In some embodiments, the service device on the private network establishes public Internet connectivity via the IP transit service.

In some embodiments, if the destination IP address is registered, data traffic from a predetermined type of website or web service routed to the destination IP address is blocked by the service device.

In some embodiments, the activation of the VPN is in response to detecting, at the telecommunication endpoint, an untrusted connection with an access network.

BRIEF DESCRIPTION OF THE DRAWING

The present disclosure is best understood from the following detailed description when read in conjunction with the accompanying drawing Figures. Like numerals denote like features throughout the specification and the drawing Figures.

DETAILED DESCRIPTION

The approach of the illustrative disclosure features a network agnostic solution that avoids the limitations of the current methods and creates a seamless environment for the users' personal and work-related applications. This solution also covers any wireless-connected device that requires a secure/lightweight method for data exchanges with privately hosted or cloud-based applications outside of the access network.

The inventors recognized that the approach to providing concurrent access from a registered subscriber to both private and public IP addresses should involve the routing of all traffic from the access network, such as a wireless local area network (LAN), into a service device of the illustrative embodiment, based on the registered subscriber having originated the traffic, and then routing the traffic accordingly according to a destination address—that is, an address in the public Internet versus one belonging to the private network of the organization identified to be associated with subscriber. In this way, the subscriber's own personal apps (e.g., Facebook™, YouTube™, etc.) will work, as they presumably will be routed to the public Internet without being subjected to their organization's private network policies that might be blocking Internet access to certain personal applications.

The VPN service disclosed herein differs from at least some VPN services in the prior art, in that the private data and public Internet data are dynamically managed on behalf of multiple organizations via the same service VPN gateway, versus using separate VPN gateways for each organization.

Figure 1A:
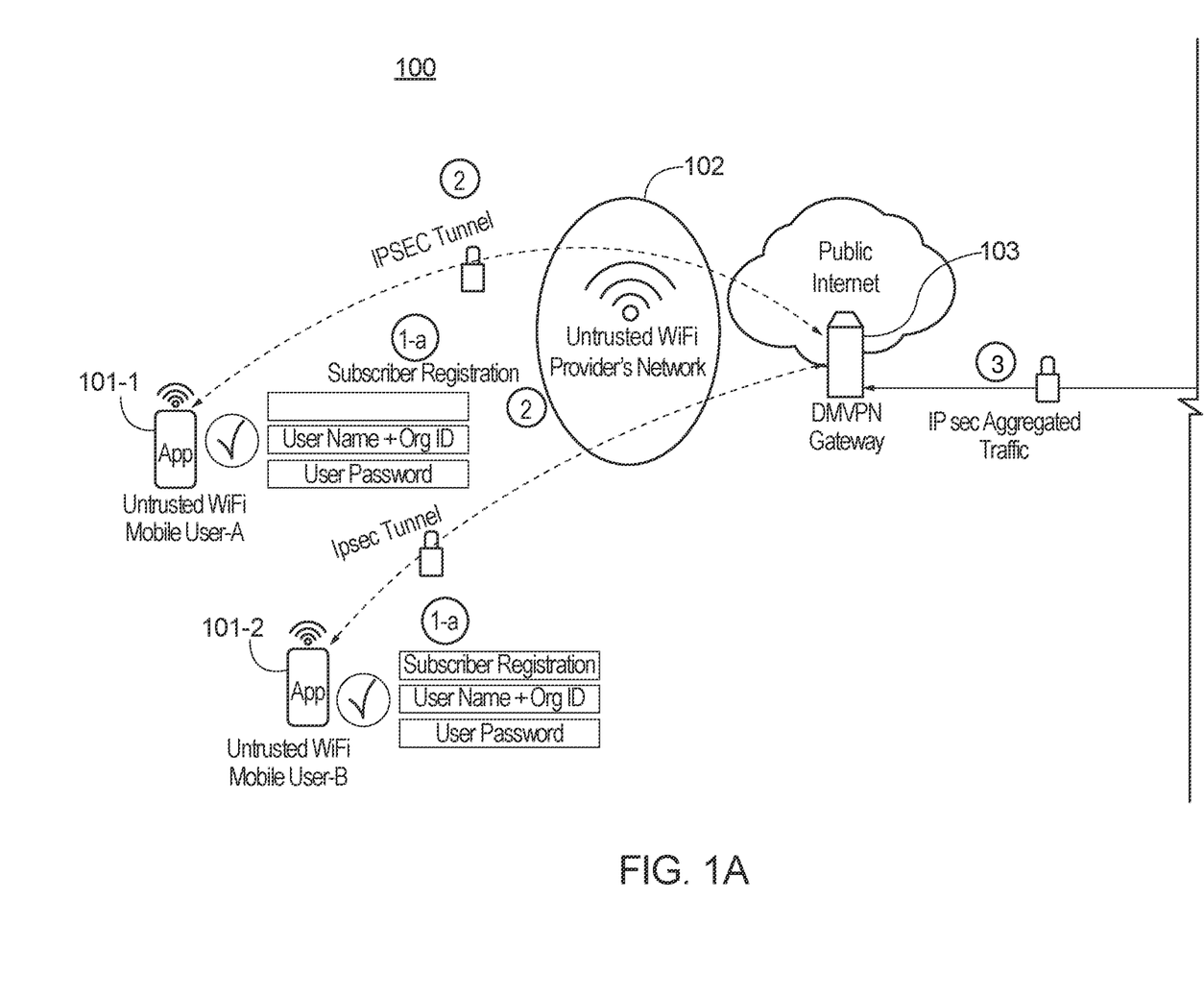
FIGS. 1A and 1B are a schematic functional diagram of a telecommunications system according to an illustrative embodiment of the present disclosure, which shows functions and interrelationships of the various elements of the system.
Figure 1B:
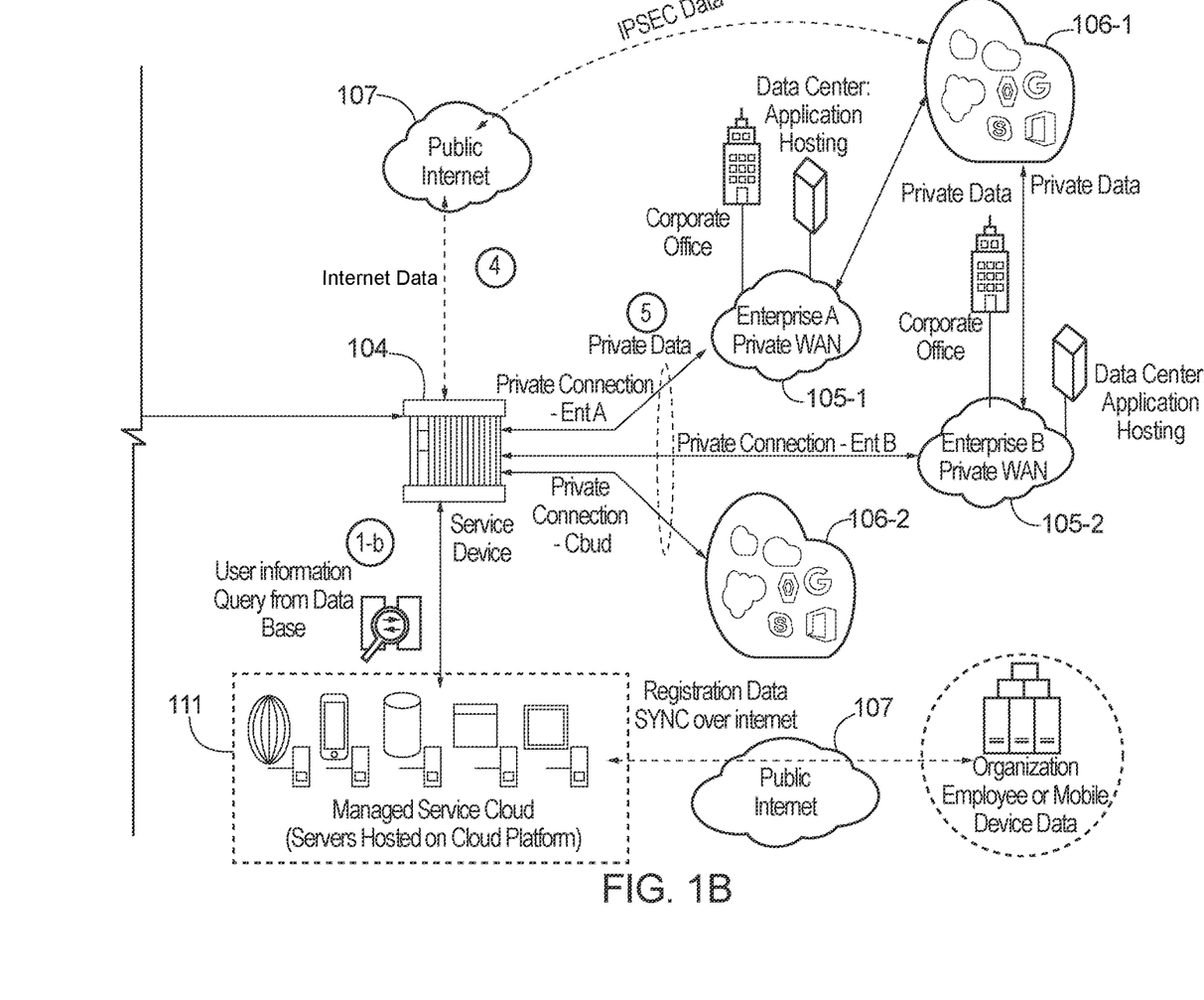

FIGS. 1A and 1B depict a schematic functional diagram of telecommunication system 100, in accordance with the illustrative embodiment of the present disclosure. System 100 comprises one or more wireless telecommunication endpoints 101-1 and 101-2, wireless local area network (LAN) 102, VPN gateway 103, service device 104, one or more enterprise systems 105-1 and 105-2, one or more cloud platforms 106-1 and 106-2, public Internet 107, and a managed service cloud platform 111, interconnected as shown.

Each wireless telecommunication endpoint 101-1, 101-2, is a user device that enables its user (e.g., human, machine, etc.) to telecommunicate wirelessly with other telecommunication endpoints, and/or with other resources within telecommunications system 100. The telecommunication endpoints 101-1, 101-2 can be mobile or immobile. The telecommunication endpoints 101-1, 101-2 are configured to perform at least some of the actions described below and in the figures. The salient components of the device that makes up each of the telecommunication endpoints 101-1, 101-2 are described below and in FIG. 2. A telecommunication endpoint 101-1, 101-2 can be a wireless terminal, a cellular telephone or cellphone, a wireless transmit/receive unit (WTRU), a user equipment (UE), a mobile station, a fixed or mobile subscriber unit, a pager, a personal digital assistant (PDA), a smartphone, a tablet, a phablet, a smart watch, a (hands-free) wearable device, a desk set, a computer, or any other type of end-user device capable of operating in a telecommunication environment, for example and without limitation.

Each telecommunication endpoint 101-1, 101-2 is capable of providing access to its user via at least one network, in this case wireless LAN 102. In accordance with the illustrative embodiment, one or more of the telecommunication endpoints 101-1, 101-2 is capable of communicating via a local area network (LAN) in accordance with the WiFi standard. In some embodiments of the present disclosure, one or more of the telecommunication endpoints 101-1, 101-2 is further capable of communication via a cellular access network within a mobile network operator (MNO) network. In some alternative embodiments of the present disclosure, one or more of the telecommunication endpoints 101-1, 101-2 is capable of communicating in accordance with one or more other standards such as the following telecommunications standards, without limitation: Global System for Mobile Communications (GSM), Universal Mobile Telecommunications System (UMTS), Long Term Evolution (LTE), CDMA-2000, IS-136 TDMA, IS-95 CDMA, 3G Wideband CDMA, IEEE 802.16 WiMax, Bluetooth, LoRa, and so on.

Each telecommunication endpoint 101-1, 101-2 is capable of storing and executing one or more software applications or "apps". For example and without limitation, a service app enables the telecommunication endpoint 101-1, 101-2, and thus its user, to listen for a WiFi (or other connection) and, based on the foregoing, to exchange information with the service virtual private network (VPN) gateway in accordance with the illustrative embodiment.

Wireless LAN 102 is a network that provides telecommunications access and connectivity to the depicted telecommunication endpoints. Wireless LAN 102 comprises an access point or equivalent, which communicates directly with each telecommunication endpoint. Wireless LAN 102 is managed by one or more service providers or operators, and provides bandwidth for various telecommunication services and network access to the telecommunication endpoints. In a security sense, Wireless LAN 102 is untrusted (or unmanaged); for example, wireless LAN 102 provides an unmanaged hot-spot at a coffee shop or other public place, or at home. In some embodiments, wireless LAN 102 comprises other computer- and/or telecommunications-networking devices, which can include gateways, routers, network bridges, switches, hubs, and repeaters, as well as other related devices.

Virtual private network (VPN) gateway 103 enables a secure network. In some embodiments of the present disclosure, VPN gateway 103 is a dynamic multipoint VPN gateway that enables the exchanging of data between sites without the need to pass traffic through an organization's headquarters' VPN server or router.

Service device 104 comprises one or more server computers and is configured to provide access into a private network from wireless LAN 102 and gateway 103.

Enterprise systems 105-1, 105-2 comprise private wide-area networks which support one or more corporate offices and data center application and storage hosting.

Managed service cloud platform 111 comprises one or more server computers and is configured to perform at least some of the actions described below and in the figures. The salient components of the server computer that makes up platform 111 are described below and in FIG. 3.

Figure 2:
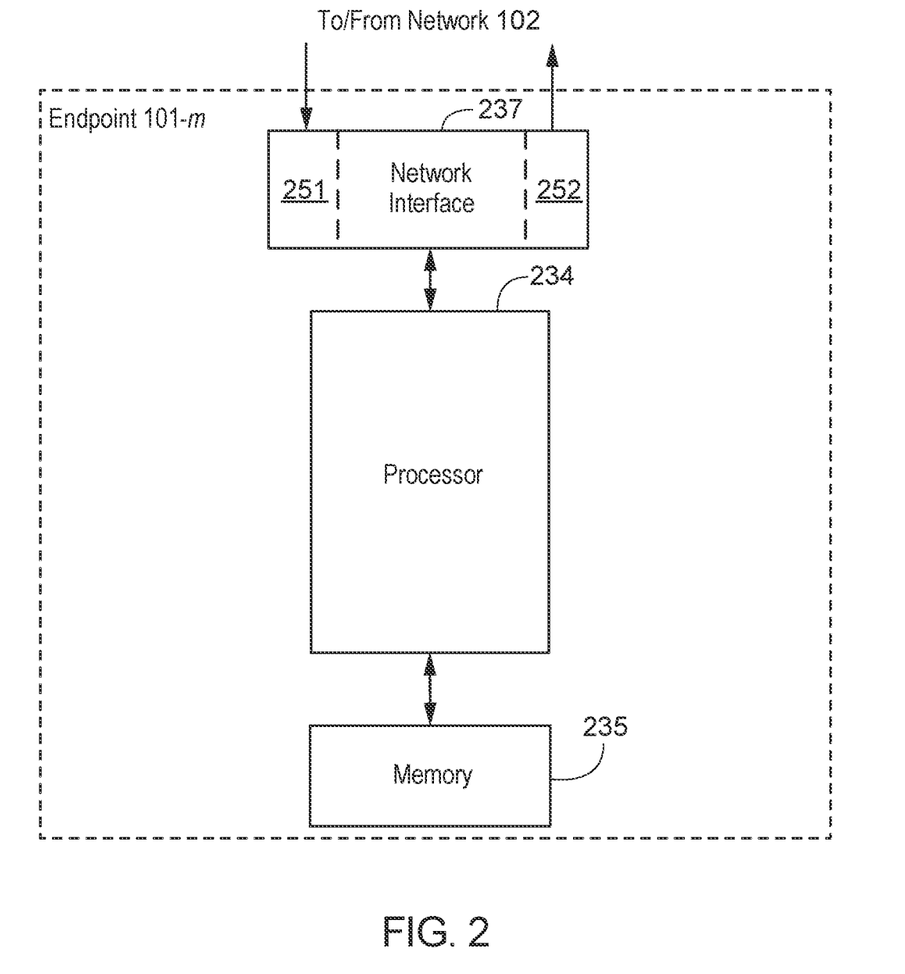
FIG. 2 is a block diagram of a wireless telecommunication endpoint according to an illustrative embodiment of the present disclosure.

FIG. 2 depicts the salient components of wireless telecommunication endpoint 101-1, 101-2 according to the illustrative embodiment of the present disclosure. Endpoint 101-1, 101-2 is based on a data-processing apparatus whose hardware platform comprises: processor 234, memory 235, and network interface 237, interconnected as shown.

Processor 234 is hardware or hardware and software that performs mathematical and/or logical operations, such as a microprocessor as is known in the art. Processor 234 is configured such that, when operating in conjunction with the other components of the telecommunication endpoint, the processor executes software, processes data, and telecommunicates according to the operations described herein. Processor 234 can be one or more computational elements.

Computer memory 235 is non-transitory and non-volatile computer storage memory technology as is known in the art (e.g., flash memory, etc.). Memory 235 is configured to store an operating system, application software, and a database. The operating system is a collection of software that manages, in well-known fashion, the telecommunication endpoint's hardware resources and provides common services for computer programs, such as those that constitute the application software. The application software that is executed by processor 234 according to the illustrative embodiment enables the telecommunication endpoint to perform the functions disclosed herein. The database of telecommunication endpoint 101-1, 101-2 is used to store, among other things, service app parameters and information described below.

Network interface 237 is configured to enable the telecommunication endpoint to telecommunicate with other devices and systems, by receiving signals therefrom and/or transmitting signals thereto via receiver 251 and transmitter 252, respectively. For example, network interface 237 enables its telecommunication endpoint to communicate with one or more other devices. Network interface 237 communicates within a local area network (LAN) in accordance with a LAN protocol (e.g., WiFi, etc.) or within a cellular network in accordance with a cellular protocol, or both. In some other embodiments, network interface 237 communicates via one or more other radio telecommunications protocols or via a wireline protocol.

Receiver 251 is a component that enables the telecommunication endpoint to telecommunicate with other components and systems by receiving signals that convey information therefrom. It will be clear to those having ordinary skill in the art how to make and use alternative embodiments that comprise more than one receiver 251.

Transmitter 252 is a component that enables the telecommunication endpoint to telecommunicate with other components and systems by transmitting signals that convey information thereto. It will be clear to those having ordinary skill in the art how to make and use alternative embodiments that comprise more than one transmitter 252.

Figure 3:
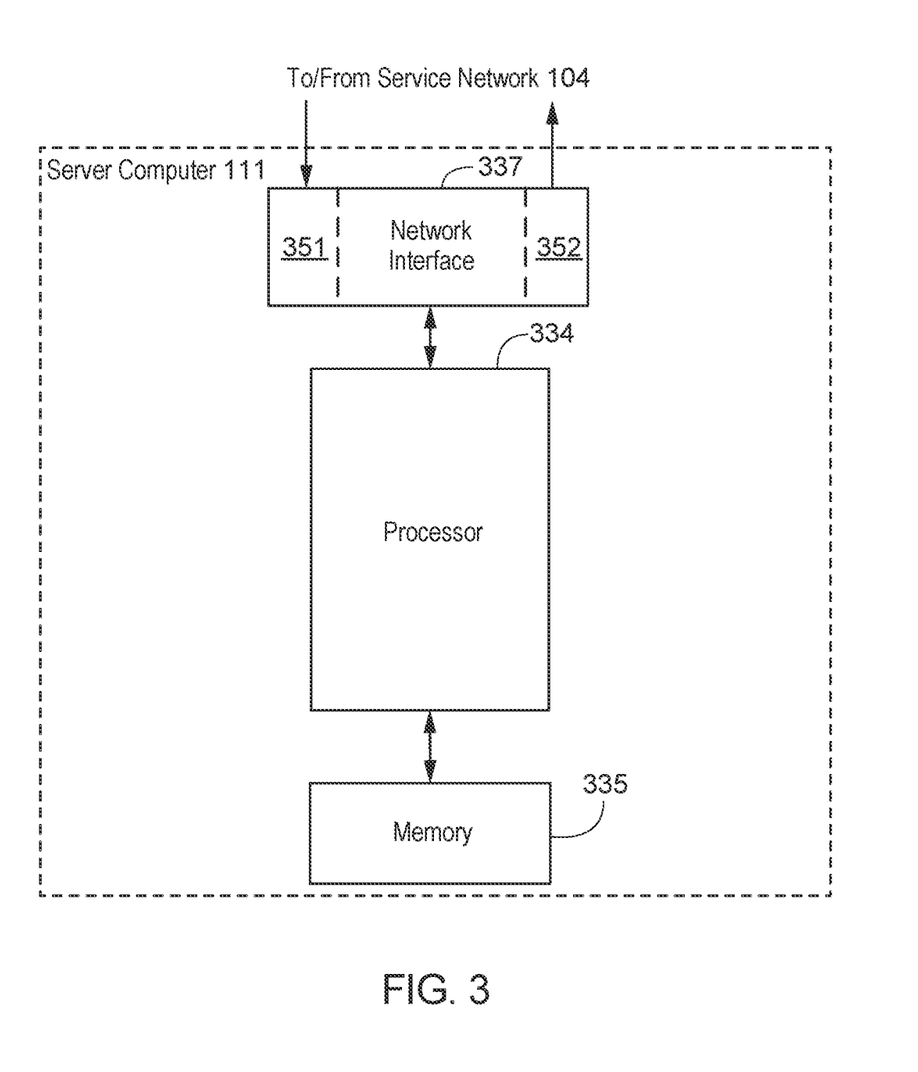
FIG. 3 is a block diagram of a server computer that forms a managed service cloud platform according to an illustrative embodiment of the present disclosure.

FIG. 3 depicts the salient components of a server computer that makes up managed service cloud platform 111 according to the illustrative embodiment of the present disclosure. The server computer is based on a data-processing apparatus whose hardware platform comprises: processor 334, memory 335, and network interface 337, interconnected as shown.

Processor 334 is hardware or hardware and software that performs mathematical and/or logical operations, such as a microprocessor as is known in the art. Processor 334 is configured such that, when operating in conjunction with the other components of the server computer, the processor executes software, processes data, and telecommunicates according to the operations described herein. Processor 334 can be one or more computational elements.

Computer memory 335 is non-transitory and non-volatile computer storage memory technology as is known in the art (e.g., flash memory, etc.). Memory 335 is configured to store an operating system, application software, and a database. The operating system is a collection of software that manages, in well-known fashion, the server computer's hardware resources and provides common services for computer programs, such as those that constitute the application software. The application software that is executed by processor 334 according to the illustrative embodiment enables the server computer to perform the functions disclosed herein. The database of the server computer of platform 111 is used to store, among other things, the policy database described below.

Network interface 337 is configured to enable the server computer to telecommunicate with other devices and systems, by receiving signals therefrom and/or transmitting signals thereto via receiver 351 and transmitter 352, respectively. For example, network interface 337 enables its server computer to communicate with one or more other devices. Network interface 337 communicates within a wide area network (WAN) in accordance with a WAN protocol. In some other embodiments, network interface 337 communicates via one or more other telecommunications protocols.

Receiver 351 is a component that enables the server computer to telecommunicate with other components and systems by receiving signals that convey information therefrom. It will be clear to those having ordinary skill in the art how to make and use alternative embodiments that comprise more than one receiver 351.

Transmitter 352 is a component that enables the server computer to telecommunicate with other components and systems by transmitting signals that convey information thereto. It will be clear to those having ordinary skill in the art how to make and use alternative embodiments that comprise more than one transmitter 352.

In some embodiments, service device 104 comprises one or more server computers such as the one described with respect to FIG. 3.

Pre-Requisite Setup with Service Device 104—Referring back to FIGS. 1A and 1B, also depicted are where the various actions described below are taken. The operations described below include various sub-operations, which are indexed as circled numbers in FIGS. 1A and 1B (e.g., "4-*b*", "1", "7-*b*", etc.).

Service device 104 of a private network, under the control of platform 111, does one or more of the following:

A. Interconnect directly with the subscriber organization's wide-area network (WAN) (e.g., enterprise 105-1, 105-2, etc.) via a private network (e.g. via MPLS, see: operation 5 in FIG. 1B) where the subscribers' private applications or data are being hosted in a data center or on a cloud service provider's platform (e.g., platform 106-1, etc.).

B. Interconnect directly with participating cloud service provider platforms (e.g., cloud platform 106-2, etc.) via a private network (e.g. MPLS, see: operation 5 in FIG. 1B) on which subscribers' organizations' applications or data are being hosted.

C. Establish public Internet connectivity via Internet Protocol (IP) transit or similar service provided by a telecom provider. (see: operation 4 in FIG. 1B).

D. Make the service application available to be downloaded or pushed and installed on the subscribers' mobile devices 101-1, 101-2. The service application will be responsible for registering the subscriber and automatically establishing and maintaining a VPN connection with the service VPN gateway 103 when the subscriber connects and establishes Internet connectivity via an untrusted wireless network. In this case, "untrusted" means a wireless network that is unknown to the service application.

Solution Logic—The processing logic of the illustrative embodiment is now described. For pedagogical purposes, a WiFi network/connection is described; however, as those who are skilled in the art will appreciate after reading this specification, a different type of wireless LAN can apply. The software based network policy platform on managed service cloud platform 111 of the illustrative embodiment dynamically determines the path of the traffic based on the destination IP address that can either be private or public and belonging to any one of the multiple organizations registered. The rules applied are as follows:

a. Upon installation and/or setup of the service app at telecommunication endpoint 101-1, 101-2, the service app prompts the user to register to confirm his/her identity and the organization he/she belongs to; in the process, a subscriber identifier is created identifying the user and/or telecommunication endpoint. Once this registration is successful, then the user credentials (user name, password & organization information) is cached and encrypted as a part of the installation process. The service app also installs and maintains a valid/unexpired public key infrastructure (PKI) certificate required to perform encryption/decryption at telecommunication endpoint 101-1, 101-2. In some embodiments of the present disclosure, and as part of the managed service cloud platform's policy engine logic, if the subscriber identifier & the organization's destination IP address are not registered in the policy database of the illustrative embodiment, then the subscriber at telecommunication endpoint 101-1, 101-2 is prompted by the service app to register the device (see: operation 1-*a* in FIG. 1A).

b. Once setup is complete, the service app at telecommunication endpoint 101-1, 101-2 runs in the background and functions as a "listener" on the telecommunication endpoint, in order to detect "untrusted" WiFi connections. Untrusted WiFi connections can include some and/or all WiFi connections that are being operated outside of a predetermined Mobile Network Partners' network. Once the untrusted WiFi connection is detected—and in some embodiments, if the Internet is also detected—then the following logic applies:

i. Activate (e.g., auto-turn on) the VPN at telecommunication endpoint 101-1, 101-2 for creating an encrypted tunnel (see: operation 2 in FIG. 1A) for all of the Internet-bound traffic from the device to service VPN gateway 103. When the connection is being established with the VPN gateway, authentication information (i.e., the user credentials mentioned earlier) is passed along and both i) re-authenticates the user automatically if it is still valid and ii) identifies the organization the user belongs to for correct managing and routing of the private/public traffic.

ii. Service VPN gateway 103 enables all traffic (see: operation 3 in FIG. 1A) to be managed through service device 104 and managed service cloud platform 111, as per points c through e below).

iii. The aforementioned operations enable service device 104 and the policy engine logic executed by one or more server computers in managed service cloud platform 111 to determine who the user is, determine the organization the user belongs to (see: operation 1-*b* in FIG. 1B), and successfully route all of the organization's private data traffic as well as the public Internet traffic, applying dynamic policy based on each of the organization's requirements.

c. Once the subscriber is registered, the determination is made by a policy engine of the managed service cloud platform 111 to keep the traffic on the private network or route the traffic to the public Internet based on the destination IP address (as per points d & e below) in each data packet subsequently received.

d. If the subscriber identifier & destination IP address are registered in the policy database, then the data remains on the private network and routed to the matching organization's private WAN (i.e., wide-area network that has its own private IP addressing) or cloud service provider platform. (see: operation 5 in FIG. 1B). Notably, two different subscribers having two different subscriber identifiers can be permitted to access the same private network (i.e., within the same organization of a given, private destination IP address). In some embodiments, the subscriber identifier in each received data packet is checked in order to determine whether the subscriber has permission to access the private network that corresponds to a private destination IP address in the received packet.

e. If the subscriber identifier is registered in the policy database & the destination IP address is not registered, then the traffic is routed via the IP transit (Internet) connection of the illustrative embodiment. (see: operation 4 in FIG. 1B).

In some embodiments of the present disclosure, telecommunication endpoint 101-1, 101-2 is also capable of accessing the organization's WAN and/or the public Internet, via a Mobile Network Operator (MNO). For example, if an untrusted WiFi connection is not detected, at some point telecommunication endpoint 101-1, 101-2 can attempt to register with managed service cloud platform 111 through an MNO's network; once registered, solution logic that is similar to points c, d, and e above can then apply.

With the afore-described architecture, the system of the illustrative embodiment is then able to provide customers with the unique capability for managing the wireless devices that are accessing their organization's network. Examples of the management features are:

a. Time of day/day of week/calendar date blacklisted public websites or destination IP addresses based on content rating or direct url/destination IP address.

b. The application of QoS or CoS rules to their wireless data traffic (i.e., see https://en.wikipedia.org/wiki/Class_of_service).

The system of the illustrative embodiment is also able to provide its customers with the unique capability for malware, intrusion and/or fraud management capabilities as it relates to a wireless device accessing their organization's network. Examples of these capabilities are:

a. Blocking of all "known" malicious website bound traffic based on the destination IP address.

b. Detecting, alerting and/or blocking potential Distributed Denial of Service (DDoS) attacks being perpetrated with the wireless device.

c. Detecting, alerting and/or blocking potential brute-force attacks for trying to compromise an organization's system being perpetrated by the wireless device.

d. Detecting, alerting and/or blacklisting devices based on suspicious activities determined through a heuristic process or method based on the historical wireless data traffic patterns.

In addition, the system of the illustrative embodiment also provides data analytics capabilities based on the wireless data traffic paths. Examples are:

a. Internet & Intranet based Services being accessed by hour/day/week/month, etc. at the organization level or across the overall customer base.

b. Performance analytics for cloud-based or content driven applications.

c. Provide wireless traffic metadata services through application programming interfaces (APIs) to interested organizations (such as marketers) based on the collection and aggregation of the wireless data traffic paths/service access across the customer base.

Figure 4:
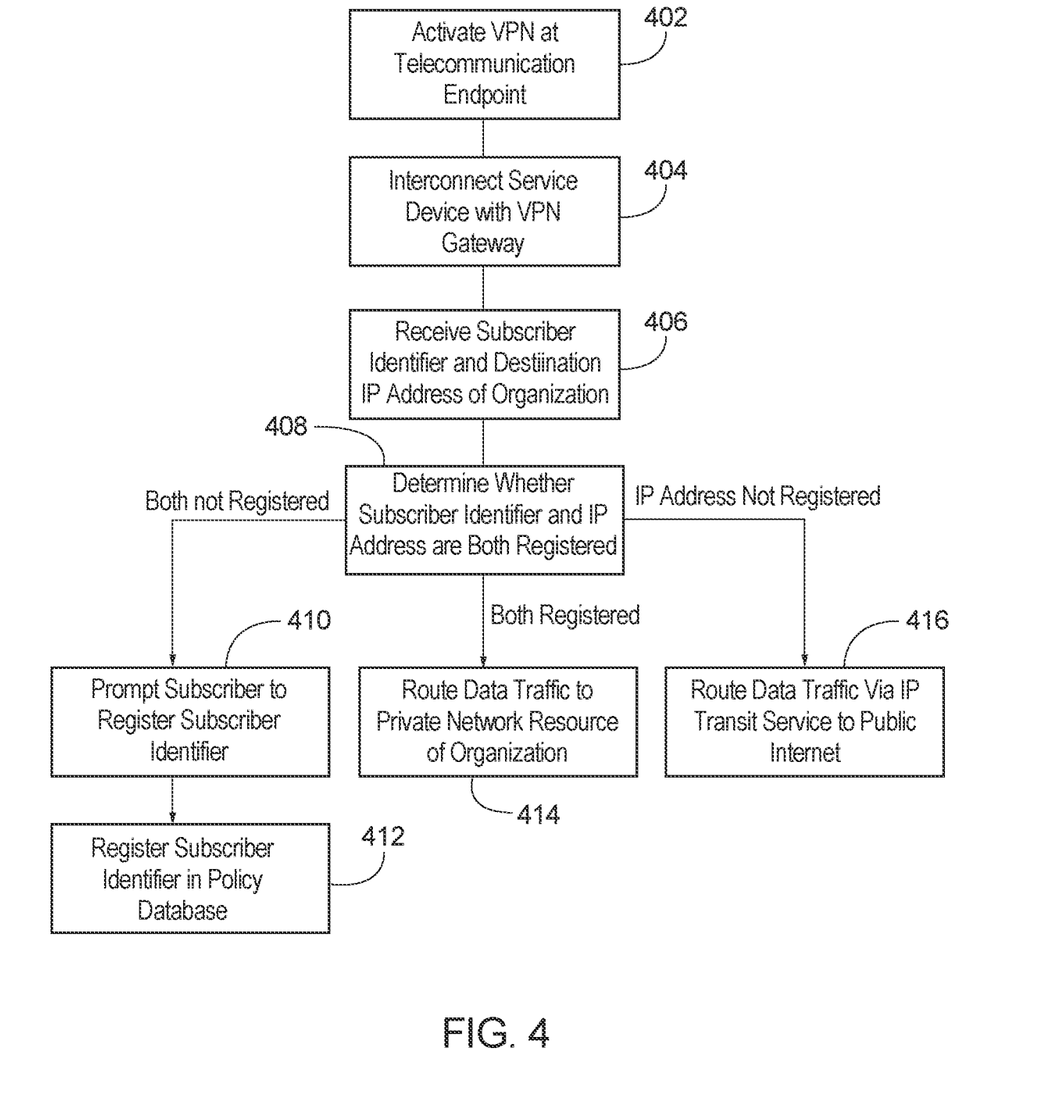
FIG. 4 is flowchart of a method for determining a path of data traffic based on a destination network IP address of an organization according to an illustrative embodiment of the present disclosure.

FIG. 4 is flowchart of a method for determining a path of data traffic based on a destination network IP address of an organization according to an illustrative embodiment of the present disclosure. In accordance with operation 402, a VPN is activated at a telecommunication endpoint, and in response to the activation of the VPN, a service device on a private network is interconnected with a VPN gateway in operation 404. In accordance with operation 406, a subscriber identifier associated with the telecommunication endpoint and a destination IP address of one of multiple organizations is received at a managed service cloud platform. In accordance with operation 408, the managed service cloud platform determines whether both the subscriber identifier and the destination IP address of the one of the multiple organizations are registered in a predetermined policy database of the managed service cloud platform. If the manage service cloud platform determines in operation 408 that both the subscriber identifier and the destination IP address of the one of the multiple organizations are not registered in a predetermined policy database, the managed service platform prompts a subscriber identified by the subscriber identifier to register the subscriber identifier associated with the telecommunication endpoint in accordance with operation 410. Then, in accordance with operation 412, the subscriber identifier is registered in the predetermined policy database, based on information received from the telecommunication endpoint.

If the managed service cloud platform determines in operation 408 that the subscriber identifier and the destination IP address of the one of the multiple organizations are registered in the predetermined policy database, a service device on a private network routes the data traffic to a private network resource of the one of the multiple organizations in accordance with operation 414.

If the managed service cloud platform determines in operation 408 that the subscriber identifier is registered in the policy database and the destination IP address of the one of the multiple organizations is not registered in the predetermined policy database, the service device on the private network routes the data traffic via an IP transit service to the public internet in accordance with operation 416.

It should be understood that the invention is not limited to the embodiments illustrated and described herein. Rather, the appended claims should be construed broadly to include other variants and embodiments of the invention, which may be made by those skilled in the art without departing from the scope and range of equivalents of the invention. It is indeed intended that the scope of the invention should be determined by proper interpretation and construction of the appended claims and their legal equivalents, as understood by those of skill in the art relying upon the disclosure in this specification and the attached drawing.

What is claimed is:

1. A method for determining a path of data traffic based on a destination Internet Protocol (IP) address, the destination IP address being either private or public and belonging to one of multiple organizations, the method comprising:
   activating, at a telecommunication endpoint, a VPN;
   interconnecting a service device on a private network with a VPN gateway, in response to activating the VPN;
   receiving, at a managed service platform, a subscriber identifier associated with the telecommunication endpoint and the destination IP address of one of the multiple organizations;
   routing, via the service device on the private network, the data traffic to a private network resource of the one of the multiple organizations matching the destination IP address when the subscriber identifier and the destination IP address of the one of the multiple organizations is registered in a predetermined policy database; and
   routing, via the service device on the private network, the data traffic via an IP transit service to a public internet when the subscriber identifier is registered in the predetermined policy database and the destination IP address of the one of the multiple organizations is not registered in the predetermined policy database.

2. The method of claim 1, wherein the private network resource is a wide-area network.

3. The method of claim of claim 2, further comprising interconnecting, via the service device on the private network, directly with the wide-area network.

4. The method of claim 1, wherein the private network resource is a cloud service provider platform.

5. The method of claim 4, further comprising interconnecting, via the service device on the private network, directly with the cloud service provider platform.

6. The method of claim 1, further comprising establishing, via the service device on the private network, public Internet connectivity via the IP transit service.

7. The method of claim 1, wherein if the destination IP address is registered, further comprising blocking data traffic from a predetermined type of website or web service, routed to the destination IP address.

8. The method of claim 1, further comprising detecting, at the telecommunication endpoint, an untrusted connection with an access network, wherein the activating of the VPN is in response to detecting the untrusted connection.

9. A system for determining a path of data traffic based on a destination Internet Protocol (IP) address, the destination IP address being either private or public and belonging to any one of multiple organizations, the system comprising:
   a telecommunication endpoint;
   a managed service platform configured to receive a subscriber identifier associated with the telecommunication endpoint and the destination of IP address of one of the multiple organizations;
   a service device on a private network configured to:
      (a) if the subscriber identifier and the destination IP address of the one of the organizations are registered in a predetermined policy database, route the data traffic to a private network resource of the one of the organizations matching the destination IP address, and
      (b) if the subscriber identifier is registered in the predetermined policy database and the destination IP address of the organization is not registered in the predetermined policy database, route the data traffic via an IP transit service to a public internet; and
   a VPN gateway configured to interconnect with the service device on the private network, in response to activating a VPN at the telecommunication endpoint.

10. The system of claim 9, wherein the private network resource is a wide-area network.

11. The system of claim of claim 10, wherein the service device on the private network is further configured to interconnect directly with the wide-area network.

12. The system of claim 9, wherein the private network resource is a cloud service provider platform.

13. The system of claim 12, wherein the service device on the private network is further configured to interconnect directly with the cloud service provider platform.

14. The system of claim 9, wherein the service device on the private network is further configured to establish public Internet connectivity via the IP transit service.

15. The system of claim 9, wherein the service device on the private network is further configured to block data traffic from predetermined type of website or web service, based on the destination IP address.

16. The system of claim 9, wherein the telecommunication endpoint is further configured to:
  detect an untrusted connection with an access network, and
  activate the VPN in response to detecting the untrusted connection.

* * * * *